United States Patent
McRae

(10) Patent No.: US 8,474,040 B2
(45) Date of Patent: Jun. 25, 2013

(54) ENVIRONMENTAL IMAGING

(75) Inventor: Scott M. McRae, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 12/708,575

(22) Filed: Feb. 19, 2010

(65) Prior Publication Data

US 2011/0209218 A1    Aug. 25, 2011

(51) Int. Cl.
H04L 29/06    (2006.01)

(52) U.S. Cl.
USPC .................... 726/22; 726/23; 726/24

(58) Field of Classification Search
USPC ..................................... 726/22–24
See application file for complete search history.

(56) References Cited

U.S. PATENT DOCUMENTS

| | | |
|---|---|---|
| 6,981,279 B1 | 12/2005 | Arnold et al. |
| 7,356,736 B2 | 4/2008 | Natvig |
| 7,370,360 B2 | 5/2008 | van der Made |
| 2005/0021994 A1 * | 1/2005 | Barton et al. .................. 713/200 |
| 2008/0189787 A1 | 8/2008 | Arnold et al. |
| 2008/0201129 A1 * | 8/2008 | Natvig ............................ 703/22 |
| 2008/0320594 A1 | 12/2008 | Jiang |
| 2009/0126015 A1 | 5/2009 | Monastyrsky et al. |

* cited by examiner

*Primary Examiner* — Jung Kim
*Assistant Examiner* — Ayoub Alata
(74) *Attorney, Agent, or Firm* — Christopher & Weisberg, P.A.

(57) ABSTRACT

A method and system for detecting whether a computer program, sent to a first computer having an operating environment including a plurality of files, includes malware is provided. A second computer obtains a plurality of environment details of the operating environment of the first computer. The second computer simulates in the second computer the presence of the plurality of files in the operating environment by exhibiting the plurality of environment details without installing the plurality of files in the second computer. The second computer executes the computer program in the second computer with the simulation and determines whether the computer program attempts to access or utilize the plurality of files in a manner indicative of malware. If not, the second computer records and generates a notification that the computer program is not malware.

25 Claims, 3 Drawing Sheets

ENVIRONMENTAL IMAGING

CROSS-REFERENCE TO RELATED APPLICATION n/a

STATEMENT REGARDING FEDERALLY SPONSORED RESEARCH OR DEVELOPMENT n/a

BACKGROUND OF THE INVENTION

1. Field of the Invention

The present invention relates generally to computer security, and more particularly, to controlled testing of a potentially malicious program.

2. Description of the Related Art

The deployment and growth of large computer networks such as the Internet has facilitated the proliferation of malicious software programs known as malware. Malware programs are designed to infiltrate a target host system without the owner's permission in order to exploit the security weaknesses of the system and network. Malware is typically used to steal information stored in the target host systems, such as account numbers, passwords, social security numbers, credit card numbers, etc.

Malware has become the preferred mode of operation for organized crime in the Internet, as malware can be spread with ease via email attachments, web downloads and file transfers. Malware carries code that damages host systems, creates backdoors to networks, allows attackers free entry into the network, redirects search engine results to paid advertisements, creates denial-of-service attacks and takes control of infected host systems.

One form of protection used to protect a target host computer from malware encompasses simulating suspicious programs at the target host computer. A simulation engine creates a simulated environment at the target host system and executes the suspicious program in order to determine whether the program is benign or harmful. The simulated environment is created with characteristics typical of a target host system environment. The simulation engine runs on the target host system in order to have access to the target host system information. Incorporating the target host system information into the simulated environment results in a simulated environment that is very similar to the real target host system environment. However, there are cases where this solution might be impractical or undesirable. For example, when the target host system is a system with limited processing power, performing the simulation locally would be impractical. In addition, there are situations where the analysis needs to be performed at a remote system and not at the target host system, such as when an anti-malware engine is deployed on a network sensor.

Moving the simulation to a remote system is likewise problematic. Savvy malware writers have developed sophisticated malware that analyzes the details of the environment to ascertain whether the malware is being run in a simulated environment or in the target host system. For example, some sophisticated malware determines an arbitrary property of the target host system and makes the execution of malicious actions dependent on the existence of that property. As such, when a simulated environment does not have the specific arbitrary property, the malware determines that the running environment is not the target host environment but instead a simulated environment. Accordingly, the malware will not perform any malicious actions during the simulation in order to avoid detection. The malware may then pose as a benign program that can be safely executed at the target host system. Since no malicious actions were performed, the simulation erroneously establishes that the suspected program is not malware.

Another solution to this problem collects the most common details and properties of a number of target host systems and then creates an average environment for simulation using those details and properties. However, this approach leaves inevitable holes in the security of the network, given that all the details and properties would not be accounted for. For example, let us assume that some target host systems are running one operating system and other target host systems are running a different operating system. The average simulated environment would be set up to run only one of the two operating systems. This solution may protect target host systems running the same operating system as the average simulated environment, but will leave the other target host systems vulnerable.

Another solution to this problem involves enhancing the simulation engine to branch into multiple simulation paths each time the suspicious program queries the environment for specific details. The simulation engine can be configured to branch into a different path for each possible answer. However, this solution requires the simulation engine to perform a large number of computations that increase as the number of queries and possible answers increases. As such, this solution is neither practical nor feasible in view of the computing resources needed to accomplish the myriad calculations.

Therefore, what is needed is a computer system and method for controlling testing of a potentially malicious program.

SUMMARY OF THE INVENTION

The present invention advantageously provides a method and system for determining whether a computer program, sent to a first computer having an operating environment including a plurality of files, includes malware. In accordance with one aspect, the present invention provides a method in which a second computer obtains a plurality of environment details of an operating environment of the first computer. The second computer simulates in the second computer the presence of the plurality files in the operating environment by exhibiting the plurality of environment details without installing the plurality of files in the second computer. The second computer executes the computer program in the second computer with the simulation and determines whether the computer program attempts to access or utilize the plurality of files in a manner indicative of malware. If not, the second computer performs one of recording and generating a notification that the computer program is not malware.

In accordance with another aspect, the present invention provides a computer system for determining whether a computer program sent to a first computer having an operating environment including a plurality of files, includes malware. The computer system has a central processing unit ("CPU"), a computer readable memory, a computer readable storage media in communication with the CPU and program instructions. The computer system has first program instructions to instruct a second computer to obtain a plurality of environment details of the operating environment of the first computer. The computer system has second program instructions to simulate in the second computer the presence of the plurality of files in the operating environment by exhibiting the plurality of environment details without installing the plurality of files in the second computer. The computer system has third program instructions to instruct the second computer to execute the computer program in the second computer with the simulation and fourth program instructions to determine whether the computer program attempts to access or utilize the plurality of files in a manner indicative of malware, and if not, instruct the second computer to perform one of recording and generating a notification that the computer program is not malware. The first, second, third and fourth program instructions are stored on the computer readable storage media for execution by the CPU via the computer readable memory.

In accordance with yet another aspect, the present invention provides a computer program product for determining whether a computer program sent to a first computer having an operating environment including a plurality of files, includes malware. The computer program product has a computer readable storage media and program instructions. The computer program product has first program instructions to instruct a second computer to obtain a plurality of environment details of the operating environment of the first computer. The computer program product has second program instructions to simulate in the second computer the presence of the plurality of files in the operating environment by exhibiting the plurality of environment details without installing the plurality of files in the second computer. The computer program product has third program instructions to instruct the second computer to execute the computer program in the second computer with the simulation and fourth program instructions to instruct the second computer to determine whether the computer program attempts to access or utilize the plurality of files in a manner indicative of malware, and if not, the second computer performing one of recording and generating a notification that the computer program is not malware. The first, second, third and fourth program instructions are stored on the computer readable storage media.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
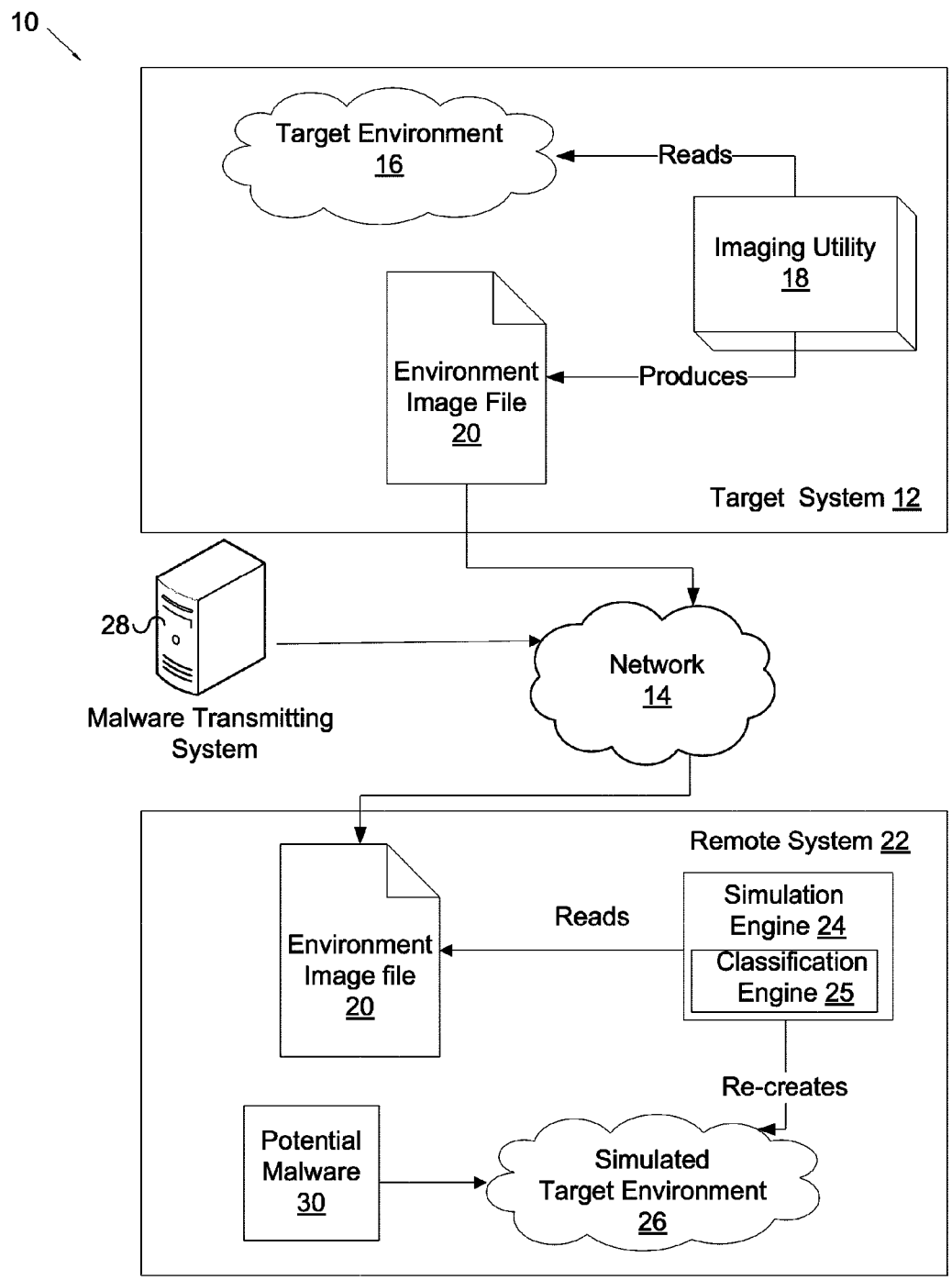
FIG. 1 is a block diagram of a system constructed in accordance with the principles of the present invention.

Before describing in detail exemplary embodiments that are in accordance with the present invention, it is noted that the embodiments reside in hardware and/or software to implement a system and method for creating a simulated target environment of a target host system at a remote system. Accordingly, the hardware and/or software components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The present invention advantageously provides a computer system and method for creating a simulated target environment at a remote system. Referring now to the drawing figures in which like reference designators refer to like elements, there is shown in FIG. 1 a diagram of a system constructed in accordance with the principles of the present invention and referred to generally as '10'. System 10 includes one or more target host systems 12. Target host system 12 may be a system having an environment that may be simulated, for example, target host system 12 may be a laptop, computer terminal, server, PDA, mobile device, etc. Target host system 12 may be a system having a software and hardware platform combination that is representative of systems deployed from base images.

Target host system 12 communicates with other devices via communication network 14. Such communication with communication network 14 can be wired or wireless. Target host system may be protected by security software running on target host system 12, which may receive suspicious programs and files from network 14 via email attachments, web browsers, file transfer websites, remote connections, etc. The security software may prevent target host system 12 from downloading malware. The security software may also operate to remove malware already infecting target host system 12. Irrespective of whether target host system 12 has security software installed, it is desirable to simulate the behavior of suspicious programs first before executing the suspicious programs in target host system 12. Executing suspicious programs in target host system 12 without first simulating the suspicious programs is not desirable given the possibility that the suspicious programs might contain malware. Simulation of suspicious programs includes creating an environment for simulation that corresponds to target environment 16 for target host system 12.

Target host system 12 is characterized by a number of properties and environment details. Target environment 16 may include properties and environment details that are particular to target host system 12. Target host system 12 has an operating environment including a plurality of files. Some of the properties and environment details that characterize target host system 12 may be, for example, file attributes such as the types of files in target host system 12, a number of files in target host system 12, file permission properties (such as read, write and executable file permission properties), a size of files in target host system 12, a number of executable files in target host system 12, a number of user generated files in target host system 12 and a number of authors of files in target host system 12.

In addition, target host system 12 may be characterized by properties and environment details such as a location of files in target host system 12, a date of creation of files in target host system 12, a date of last edit of files in target host system 12, a date of last time of execution of files in target host system 12, a content of files in target host system 12, existence of a system files directory in target host system 12, file paths of files in target host system 12 and a number of temporary files in target host system 12.

Other properties and environment details that characterize target host system 12 may include, for example a user-defined data associated with files in target host system 12, a number of compressed files in target host system 12, a number of indexed files in target host system 12, a number of encrypted files in target host system 12 and a number of password protected files in target host system 12.

Further, target host system 12 may be characterized by a number of archived files in target host system 12, a number of modified files in target host system 12, a number of user accessed files in target host system 12, a number of files downloaded in target host system 12, a history of recent opened files on target host system 12, a history of recent viewed websites on target host system 12, etc.

Other properties and environment details that characterize target host system 12 may be, for example, a type of operating system running in target host system 12, a number of operating systems installed in target host system 12, a number of users registered on target host system 12, a network name of target host system 12, a processor type of target host system 12, a memory size of target host system 12 and a number of hard disks in target host system 12.

In addition, target host system 12 may be characterized by properties and environment details such as a hard disk size of a hard disk in target host system 12, a number of disk drives in target host system 12, a type of drives in target host system 12, a number of display adapters in target host system 12, a number of disk controllers in target host system 12, a type of disk controllers in target host system 12, a type of input device in target host system 12, a type of output device in target host system 12 and a type of network adapter in target host system 12.

Other properties and environment details that characterize target host system 12 may include, for example a number of network adapters in target host system 12, a number of ports in target host system 12, a type of ports in target host system 12, a number of used ports in target host system 12, a type of sound and video controller in target host system 12 and a number of sound and video controllers in target host system 12.

Further, target host system 12 may be characterized by a type of display in target host system 12, a type of display adapters in target host system 12, a number of disk partitions in target host system 12, a number of SCSI controllers in target host system 12, a number of IDE controllers in target host system 12, a motherboard type of target host system 12, etc.

In accordance to one aspect, other properties and environment details that characterize target host system 12 may be, for example, a computer description of target host system 12, a component manufacturer (motherboard, bios, memory, drives, etc.) of target host system 12, a firmware software installed in target host system 12, a printer capability of target host system 12, a cache size of target host system 12, a number of physical processors in target host system 12 and a number of logical processors in target host system 12.

In addition, target host system 12 may be characterized by properties and environment details such as a number of program libraries installed in target host system 12, a clock speed of target host system 12, a number of networks connected to target host system 12, a type of networks connected to target host system 12, a number of PCI slots in target host system 12, a number of registry keys in target host system 12 and registry settings for target file system 12.

Other properties and environment details that characterize target host system 12 may be, for example a number of shared connections in target host system 12, a number of users in target host system 12, a number of programs installed in target host system 12, types of programs (for example, applications and middleware) installed in target host system 12, types of programs (for example, applications and middleware) running in target host system 12, a type of network connections of target host system 12 and a type of security programs in target host system 12.

Further, target host system 12 may be characterized by accessibility options of target host system 12, a type of administrative tools installed in target host system 12, a power profile of target host system 12, a type of firewall in target host system 12, a type of tasks running in target host system 12, a type of scheduled tasks of target host system 12, an IP address of target host system 12, a number of administrator accounts in target host system 12, existence of a DHCP server in target host system 12 and a size of a log file in target host system 12.

Some of the properties and environment details that characterize target host system 12 may be, for example, a number of spooled events in target host system 12, a number of threads running on target host system 12, a number of UDP connections in target host system 12, a number of TCP connections in target host system 12, a type of file system of target host system 12, a number of anonymous/guest user connections to target host system 12, a number of active processes in target host system 12, a type of active processes in target host system 12, etc. Of course, the above-provided lists are merely exemplary, it being understood that other target host system properties and environment details can be used.

It is contemplated that at least some of the properties and environment details that characterize target host system 12 are present in target environment 16. Target environment 16 may be a collection of specific details about the hardware and the software platform of target host system 12, including but not limited to one or more of the aforementioned properties and environment details. The hardware and software platform may be probed by software programs running on target host system 12. Target environment 16 may also be defined by other variables external to target host system 12.

In accordance with one aspect, a computer program, such as imaging utility 18 on target host system 12, operates to read and analyze target environment 16 in order to ascertain the properties and environment details of target environment 16. Imaging utility 18 may be located locally on target host system 12, on a different system, or in a storage medium such as a portable memory stick or an external hard drive. The properties and environment details that define target environment 16 may also be available over network 14 to other programs in other systems. Target host system 12 may be configured to send the properties and environment details that define target environment 16 to other systems connected network 14. The properties and environment details may also be stored in a database located at target host system 12 or at another system. The database may be accessible to systems connected to network 14.

In accordance with one aspect, imaging utility 18 may make the properties and environment details available to other programs and systems. For example, imaging utility 18 may send the properties and environment details to other devices via network 14 or may allow other systems to connect to target host system 12 to read the properties and environment details. Imaging utility 18 may also produce an environment file. In accordance with one aspect, imaging utility 18 reads target environment 16 and produces environment image file 20. Imaging utility 18 may use an environmental imaging technique to produce environment image file 20. Imaging utility 18 may capture specific details about target environment 16 in the form of environment image file 20. The plurality of environment details of the operating environment of target host system 22 can be stored in environment image file 20.

Environment image file 20 may be produced in different file formats and may have different file attributes. For example, environment image file 20 may be an ascii file, a text file, a word processor file, an image file, a binary file, a parse file, a bin file, a comma delimited file, a graphics file, an html file, a command file, a compressed file, an encrypted file, an archived file, a program specific file, a compiled file, a database file, an ansi file, a field text file, a pdf file, an xml file, a password protected file, a rich text document file, a tiff file, an operating system specific file, etc. Environment image file 20 may contain in serialized form properties and environment details that make up target environment 16. Environment image file 20 may contain all or some of the properties used to define target environment 16. In one embodiment, the environment file may be stored at target host system 12 or at a different system. Environment image file 20 may also be available to remote system 22 or may be sent to remote system 22 via network 14.

Remote system 22 may be one of a laptop, computer terminal, server, PDA, mobile device, etc. Remote system 22 is connected to network 14 via a wired or wireless connection. Remote system 22 obtains a plurality of environment details and properties of the operating environment of target host system 12. Remote system 22 reads environment image file 20 using simulation engine 24. Simulation engine 24 analyzes environment image file 20 and uses information in environment image file 20 to create simulated target environment 26. According to one aspect, the imaging technique may perform the same types of queries on target host system 12 as malware would perform using the same Application Program Interfaces ("API"). The results of these queries can then be captured and replicated in simulated target environment 26 when malware calls those APIs. For example, imaging utility 18 may query target environment 16. The answers to the queries may be saved in environment image file 20. During simulation, simulation engine 24 may provide the answers to malware when malware calls the APIs. Simulation engine 24 may select some properties and environment details specified in environment image file 20 in order to create simulated target environment 26. Simulation engine 24 may run an algorithm to determine which properties in environment image file 20 are relevant for creating simulated target environment 26. Simulation engine 24 may decide to use some or all of the information in environment image file 20. Simulation engine 24 may select key properties, simplify property approximations, use a subset of the properties and environment details, and assume property values in creating simulated target environment 26. Target host system 12 may initially be pre-configured with a hard-coded list of properties and environment details to scan and re-produce in remote system 22. This list may be expanded during updates to target host system 12 on an on-going basis as new properties queried by malware are discovered. In accordance with one aspect, key properties may be likely to include programs installed, registry settings, and files on disk. In accordance with another aspect, it may be likely that all properties and environment details present in environment image file 20 are used in the simulation. An example of simplified property approximations may include capturing a existence of a file, the file name and size, but not the file contents, with the expectation that malware would not try to read the file. If malware does try to read the file, reasonable file data may be generated based on the expected file type (for example some random generated image if the file is a jpeg type file). It may be likely that the simulation would fail in this case and the list of imaged properties and environment details would need to be extended to avoid future failure. Simulation engine 24 may also request that a user selects which properties and environment details in environment image file 20 are relevant for creating simulated target environment 26. Simulation engine 24 may be configured to select some or all of the properties in environment image file 20. For example, simulation engine 24 may select properties and environment details such as a type of disk drives in target host system 12, which files and folders are stored in the disk drives of target host system 12, who owns the files and folders in target host system 12, permissions of the files and folders of target host system 12, a size of the files and folders in target host system 12, actual data file for system files in target host system 12, complete registry settings of target host system 12 and an active process list of target host system 12.

Simulation engine 24 may communicate remotely with another system to receive instructions on which properties and environment details in environment image file 20 to use to create simulated target environment 26. Simulation engine 24 creates simulated target environment 26 to imitate target environment 16. Remote system 22 simulates at remote system 22 the presence of the plurality of files in the operating environment of target host system 12 by exhibiting the plurality of environment details without installing the plurality of files in the remote system 22. In accordance with one aspect, environment image file 20 allows remote system 22 to use properties and environment details of target environment 16 to allow remote system 22 to simulate target environment 16. Simulation engine uses simulated target environment 26 to execute a suspicious program. Remote system 22 executes the suspicious program in remote system 22 with the simulation. Simulation engine 24 determines, based on the results of the simulation, whether the suspicious program is a safe program that can be executed at target host system 12 or whether the suspicious program contains malware.

As is shown in FIG. 1, malware transmitting system 28 communicates with other devices via network 14. Malware transmitting system 28 may be any computing device, for example, laptop, computer terminal, server, PDA, mobile device, etc. Malware transmitting system 28 may be located in a remote location from target host system 12, may have a different domain than target host system 12 or may be part of a same network as target host system 12.

Malware transmitting system 28 sends a suspicious program to target host system 12 via network 14. Malware transmitting system 28 may send the suspicious program via an email attachment, a file download, a web browser, etc. Malware transmitting system 28 may also make the suspicious program available to other systems connected to target host system 12 for download. The suspicious program may be categorized as malware, adware, spyware, virus, worm, trojan, rootkit, crimeware, and other malicious type of software. In one embodiment, the suspicious program is potential malware 30. Potential malware 30 may be a program that copies itself and, but for the present invention, would infect target host system 12. Potential malware 30 can also be a program that contains polymorphic code that mutates with every execution, or a program that contains metamorphic code and rewrites itself completely each time it is executed. If executed at target host system 12, potential malware 30 would destroy data in target host system 12, affect the functional performance of target host system 12, transfer control of target host system 12 to a third party, access information on target host system 12, etc.

In accordance with one aspect, simulated target environment 26 simulates target environment 16. Simulation engine 24 executes potential malware 30 in simulated target environment 26. In accordance with the present invention, the simulation is performed remotely at remote system 22 as opposed to locally at target host system 12. Potential malware 30 is executed in simulated target environment 26 in order to evaluate, study, model and determine the eventual real effects of executing potential malware 30. Simulated target environment 26 can be used to predict the future behavior of potential malware 30 by analyzing the underlying mechanisms used by potential malware 30 to attempt to control the behavior of target host system 12. Simulation engine 22 may execute potential malware 30 on simulated target environment 26 to determine whether potential malware 30 may be safely run on target host system 12. Remote system 22 may determine whether potential malware 30 attempts to access or utilize the plurality of files in the simulation in a manner indicative of malware. If not, remote system 22 may perform one of recording and generating a notification that potential malware 30 is not malware. Simulation engine 24 may use behavioral analysis techniques, described below, to identify potential malware 30 as malicious software and to block potential malware 30 from spreading to network 14 and to target system 12. The simulation may use a computationally tractable simulation method as opposed to a branching simulation method. Computationally tractable simulation methods are used when there is a large number of variables to be considered. Using a large number of variables to create a simulation will result in a simulation of vast computational complexity. The computationally tractable simulation method develops tractable approximations of the variables to prevent a complex simulation. Branching simulation methods allow the simulation to act one way or another depending on what the input condition is for a specific simulation event. The branching simulation method takes a number of possible choices into account and offers a response for each of the possible choices.

In accordance with one aspect, simulation engine 24 may determine that potential malware 30 is a malicious program, i.e. malware. Simulation engine 24 may use classification engine 25 to determine that potential malware 30 is malware. Classification engine 25 may run a number of predefined rules and may use information from databases to determine whether potential malware 30 is malware. Simulation engine 24 may detect a malicious behavior as defined by a set of rules. Methods of actual scanning and detection are beyond the scope of the present invention. Simulation engine 24 may alert a system administrator of the presence of a malicious program by performing a malware action. Some examples of malware actions may include alerts such as flashing a warning message on a screen, emailing the system administrator, updating a system log with an entry describing the malware, sounding an alarm, running a malware removal program, identifying a classifier of malware behavior to ease future identification of malware, performing a functional and content related analysis of the malware, updating a database containing previously identified malware, storing a malware identifier in a local or remote database, extracting a malware signature and subsequently providing access to the extracted signature to easily recognize the malware in the future, etc.

Figure 2:
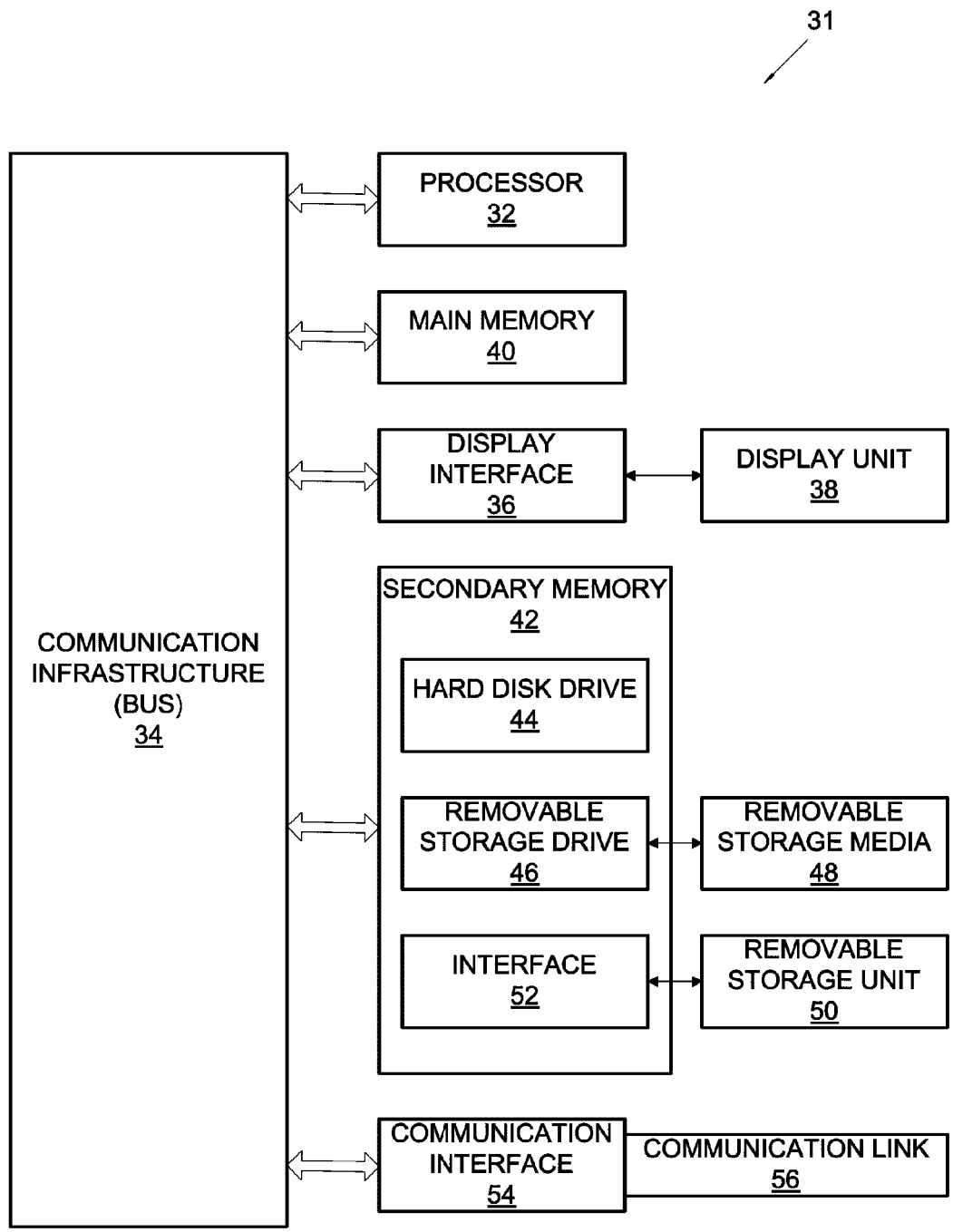
FIG. 2 is a block diagram of an exemplary target and remote computing devices constructed in accordance with the principles of the present invention.

FIG. 2 is a block diagram of an exemplary system constructed in accordance with the principles of the present invention and referred to generally as '31.' System 31 may be an exemplary target host system 12 (FIG. 1), remote system 22 (FIG. 1) or malware transmitting system 28 (FIG. 1). System 31 includes one or more processors, such as processor 32 programmed to perform the functions described herein. The processor 32 is connected to a communication infrastructure 34, e.g., a communications bus, cross-bar interconnect, network, etc. Target Environment 16 and imaging utility 18 may be computer programs stored on disk storage for execution by a central processing unit ("CPU") via RAM in target host system 12. Simulation engine 24 and simulated target environment 26 may be computer programs stored on disk storage for execution by a central processing unit ("CPU") via RAM in remote system 22. Various software embodiments are described in terms of this exemplary computer system. After reading this description, it will become apparent to a person of ordinary skill in the relevant art(s) how to implement the invention using other computer systems and/or computer architectures. It is also understood that the capacities and quantities of the components of the architecture described below may vary depending on the device, the quantity of devices to be supported, as well as the intended interaction with the device. For example, access to target host system 12 for configuration and management may be designed to occur remotely by web browser. In such case, the inclusion of a display interface and display unit may not be required.

The system 31 may optionally include or share a display interface 36 that forwards graphics, text, and other data from the communication infrastructure 34 (or from a frame buffer not shown) for display on the display unit 38. The computer system also includes a main memory 40, preferably random access memory ("RAM"), and may also include a secondary memory 42. The secondary memory 42 may include, for example, a hard disk drive 44 and/or a removable storage drive 46, representing a floppy disk drive, a magnetic tape drive, an optical disk drive, etc. The removable storage drive 46 reads from and/or writes to a removable storage media 48 in a manner well known to those having ordinary skill in the art. Removable storage media 48, represents, for example, a floppy disk, magnetic tape, optical disk, etc. which is read by and written to by removable storage drive 46. As will be appreciated, the removable storage media 48 includes a computer usable storage medium having stored therein computer software and/or data.

In alternative embodiments, the secondary memory 42 may include other similar means for allowing computer programs or other instructions to be loaded into the computer system and for storing data. Such means may include, for example, a removable storage unit 50 and an interface 52. Examples of such may include a program cartridge and cartridge interface (such as that found in video game devices), flash memory, a removable memory chip (such as an EPROM, EEPROM or PROM) and associated socket, and other removable storage units 50 and interfaces 52 which allow software and data to be transferred from the removable storage unit 50 to other devices.

The system 31 may also include a communications interface 54. Communications interface 54 allows software and data to be transferred to external devices. Examples of communications interface 54 may include a modem, a network interface (such as an Ethernet card), a communications port, a PCMCIA slot and card, wireless transceiver/antenna, etc. Software and data transferred via communications interface/module 54 are in the form of signals which may be, for example, electronic, electromagnetic, optical, or other signals capable of being received by communications interface 54. These signals are provided to communications interface 54 via the communications link (i.e., channel) 56. This channel 56 carries signals and may be implemented using wire or cable, fiber optics, a phone line, a cellular phone link, an RF link, and/or other communications channels.

Of course, system 31 may have more than one set of communication interface 54 and communication link 56. For example, system 31 may have a communication interface 54/communication link 56 pair to establish a communication zone for wireless communication, a second communication interface 54/communication link 56 pair for low speed, e.g., WLAN, wireless communication, another communication interface 54/communication link 56 pair for communication with low speed wireless networks, and still another communication interface 54/communication link 56 pair for other communication.

Computer programs (also called computer control logic) are stored in main memory 40 and/or secondary memory 42. For example, computer programs are stored on disk storage, i.e. secondary memory 42, for execution by processor 32 via RAM, i.e. main memory 40. Computer programs may also be received via communications interface 54. Such computer programs, when executed, enable the method and system to perform the features of the present invention as discussed herein. In particular, the computer programs, when executed, enable the processor 32 to perform the features of the corresponding method and system. Accordingly, such computer programs represent controllers of the corresponding device.

Figure 3:
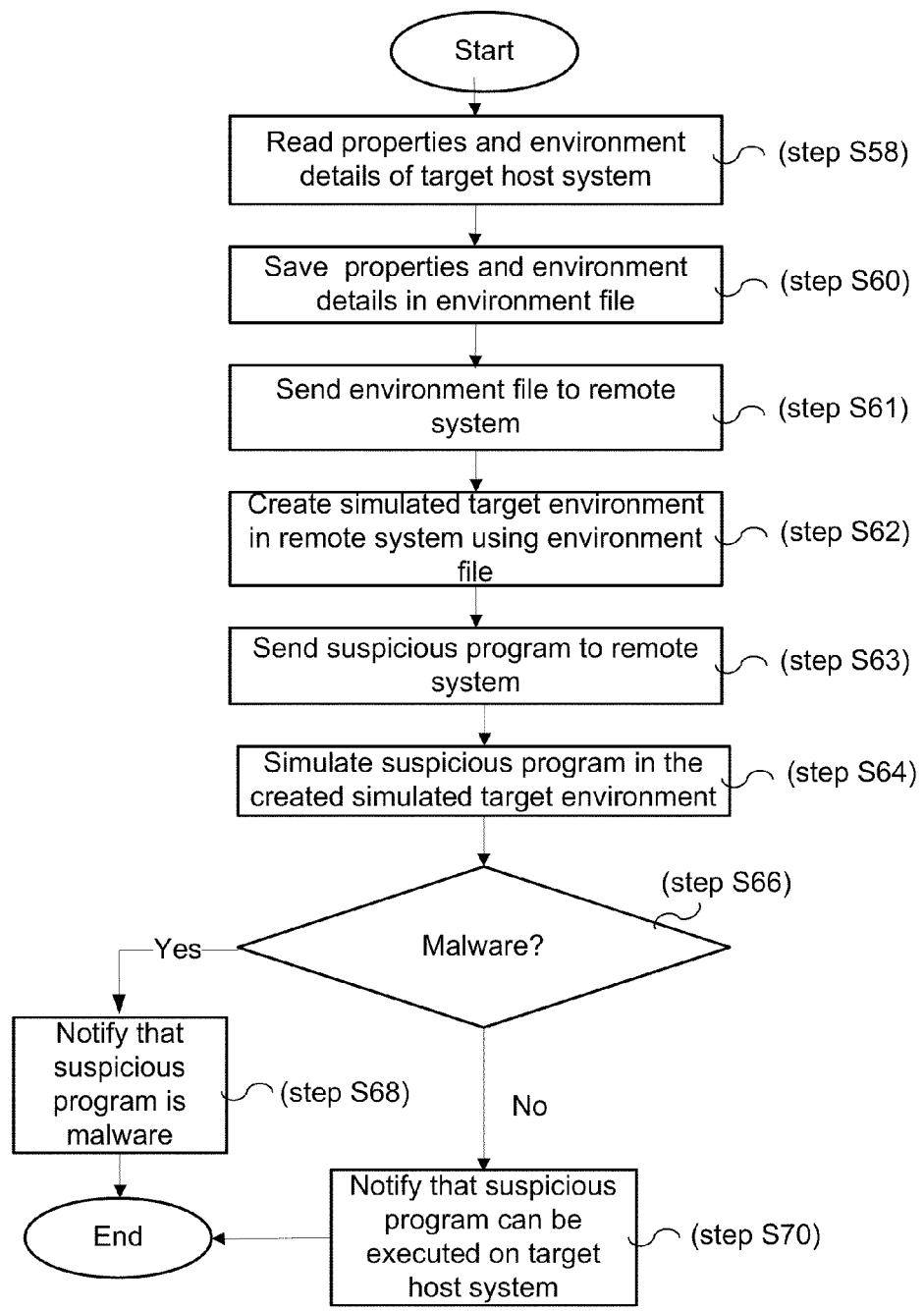
FIG. 3 is a flowchart of an exemplary simulation process performed in accordance with the principles of the present invention.

FIG. 3 is a flowchart of an exemplary method performed in accordance with the principles of the present invention. The process flow may be implemented using an exemplary system, such as the exemplary system of FIG. 1. In accordance with one aspect, imaging utility 18 reads the properties and environment details of target host system 12 from target environment 16 (step S58). Imaging utility 18 saves the properties and environment details of target host system 12 in environment image file 20 (step S60). Imaging utility 18 sends the environment image file 20 to remote system 22 (step S61). Simulation engine 24 creates simulated target environment 26 in remote system 22 using the environment image file 20 (step S62). Malware transmitting system sends a suspicious program to remote system 22 (step S63). Simulation engine 24 simulates the suspicious program in simulated target environment 26 (step S64). Simulation engine 24 makes a decision as to whether the suspicious program is malware based on predetermined behavioral rules that characterize malware (step S66). If the simulation engine 24 determines that the suspicious program is malware based on malicious behavior, the simulation engine records and displays that the suspicious program is malicious and notifies an administrator by email or otherwise (step S68). If simulation engine 24 determines that the suspicious program is not malware, i.e. the suspicious program is a safe program, the program records and displays this, and notifies an administrator via email or otherwise that the suspicious program can be installed and executed on target host system 12 (step S70).

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product that comprises all the features enabling the implementation of the methods described herein, and which, when loaded in a computing system is able to carry out these methods. Storage medium refers to any volatile or non-volatile computer readable storage device such as magnetic storage, semiconductor memory, DVD, Compact Disk or memory stick.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. A variety of modifications and variations are possible in light of the above teachings without departing from the scope and spirit of the invention, which is limited only by the following claims.

What is claimed is:

1. A method for determining whether a computer program, addressed to a first computer having a plurality of files different than the computer program, includes malware, the method comprising the steps of:
   a second computer receiving the computer program via a network;
   in response to receiving the computer program the second computer, requesting from the first computer identification of the plurality of files in the first computer and at least one of respective creation dates and respective last edit dates of the plurality of files in the first computer;
   listing in a file in the second computer, without installing the plurality of files in the second computer, identities of the plurality of files in the first computer and the at least one of the respective creation dates and respective last edit dates obtained from the first computer for the respective plurality of files in the first computer;
   creating, for the computer program, a simulated operating environment in the second computer using the file having the listing of identities of the plurality of files in the first computer and the at least one of the respective creation dates and respective last edit dates;
   executing the computer program in the second computer; and
   the second computer determining whether the computer program attempts to access or utilize the plurality of files in a manner indicative of malware, and if so, the second computer generating a first record that the computer program exhibits a characteristic of malware, and if not, the second computer generating a second record that the computer program is does not exhibit a characteristic of malware.

2. The method of claim 1, further comprising instructing the first computer, to which the computer program was sent, to execute the computer program if the second computer determines that the computer program is not malware.

3. The method of claim 1, further comprising the first computer, to which the computer program was sent, storing a plurality of environment details of the operating environment of the first computer in the file, the plurality of environment details including data on:
   a plurality of computer programs installed in the first computer;

at least one file of the plurality of files installed in the first computer; and
a registry setting of the first computer.

4. The method of claim 3, further comprising the first computer transmitting the file to the second computer, the file including a number of operating systems installed in the first computer.

5. The method of claim 1, wherein the file includes a plurality of environment details of an operating environment of the first computer, the plurality of environment details comprising a file attribute of the plurality of files stored in the first computer.

6. The method of claim 1, wherein a plurality of environment details of an operating environment of the first computer stored in the file comprise a number of users registered on the first computer and a number of program libraries installed in the first computer.

7. The method of claim 1, wherein the file includes a number of ports in the first computer.

8. A computer system for determining whether a computer program addressed to a first computer having a plurality of files different than the computer program, includes malware, the computer system comprising:
a central processing unit (CPU);
a computer readable memory, the computer readable memory in communication with the CPU;
a computer readable tangible storage device;
first program instructions to instruct a second computer to obtain a file including a plurality of environment details of the first computer, the plurality of environment details including one of creation dates and last edit dates for the plurality of files in the first computer;
second program instructions to create in the second computer, without installing the plurality of files in the second computer, a simulated environment using the file, the simulated environment simulating the presence of the plurality of files in the first computer and the plurality of environment details;
third program instructions to instruct the second computer to execute the computer program in the simulated environment in the second computer; and
fourth program instructions to determine whether the computer program attempts to access or utilize the plurality of files in a manner indicative of malware, and if not, instruct the second computer to perform one of recording and generating a notification that the computer program does not exhibit a characteristic of malware; and
wherein the first, second, third and fourth program instructions are stored on the computer readable tangible storage device for execution by the CPU via the computer readable memory.

9. The system of claim 8, wherein the computer system comprises fifth program instructions to instruct the first computer to execute the computer program if the second computer determines that the computer program is not malware, wherein the fifth program instructions are stored on the computer readable tangible storage device for execution by the CPU via the computer readable memory.

10. The system of claim 8, wherein the plurality of environment details includes a cache size of the first computer, a number of physical processors in the first computer, and a number of logical processors in the first computer.

11. The system of claim 10, wherein the computer system comprises fifth program instructions to read the file, wherein the fifth program instructions are stored on the computer readable tangible storage device for execution by the CPU via the computer readable memory.

12. The system of claim 10, wherein the computer system comprises fifth program instructions to alert the first computer that the computer program is malware, wherein the fifth program instructions are stored on the computer readable tangible storage device for execution by the CPU via the computer readable memory.

13. The system of claim 8, wherein the plurality of environment details of the operating environment of the first computer comprise a file attribute of a file stored in the first computer.

14. The system of claim 8, wherein the plurality of environment details of the operating environment of the first computer comprise at least one of a hardware and a software characteristic of the first computer.

15. A computer program product for determining whether a computer program addressed to a first computer including a plurality of files different than the computer program, includes malware, the computer program product comprising:
a computer readable tangible storage device;
first program instructions to instruct a second computer to obtain a file including a plurality of environment details of the first computer, the plurality of environment details including one of creation dates and last edit dates for the plurality of files in the first computer;
second program instructions to create in the second computer, without installing the plurality of files in the second computer, a simulated environment using the file, the simulated environment simulating the presence of the plurality of files in the first computer and the plurality of environment details;
third program instructions to instruct the second computer to execute the computer program in the simulated environment in the second computer; and
fourth program instructions to instruct the second computer to determine whether the computer program attempts to access or utilize the plurality of files in a manner indicative of malware, and if not, the second computer performing one of recording and generating a notification that the computer program is not malware,
wherein the first, second, third and fourth program instructions are stored on the computer readable tangible storage device.

16. The computer program product of claim 15, further comprising fifth program instructions to instruct the first computer to execute the computer program if it is determined that the computer program is not malware, wherein the fifth program instructions are stored on the computer readable tangible storage device for execution.

17. The computer program product of claim 15, wherein the plurality of environment details of the operating environment of the first computer stored in the file include a number of networks that the first computer is connected to.

18. The computer program product of claim 17, further comprising fifth program instructions to instruct the second computer to receive the file, wherein the fifth program instructions are stored on the computer readable tangible storage device.

19. The computer program product of claim 15, further comprising fifth program instructions to alert the first computer that the computer program is malware, wherein the fifth program instructions are stored on the computer readable tangible storage device.

20. The computer program product of claim 15, wherein the plurality of environment details comprise at least one of a file attribute of the plurality of files stored in the first computer, a hardware characteristic of the first computer and a software characteristic of the first computer.

21. The method of claim 1, wherein the second computer does not execute requests of the computer program that would ordinarily be executed if the plurality of other computer programs were installed in the second computer.

22. The method of claim 1, wherein the file includes a number of ports in the first computer and a type of sound and video controller of the first computer.

23. The method of claim 3, wherein the file further includes a plurality of properties of the operating environment of the first computer, the method further comprising:
   creating a simulated environment in the second computer using the file.

24. The method of claim 23, further comprising:
   receiving from the first computer program a request for information;
   analyzing the file to determine an answer to the request for information;
   providing a determined answer to the request for information to the computer program.

25. The method of claim 1, wherein determining whether the computer program attempts to access or utilize the plurality of files in a manner indicative of malware includes determining the eventual real effects of executing the computer program and analyzing the underlying mechanisms used by the computer program to attempt to control the behavior of the first computer.

* * * * *